United States Patent [19]
Turner et al.

[11] Patent Number: 6,090,900
[45] Date of Patent: Jul. 18, 2000

[54] POLYMERS CONTAINING FUNCTIONALIZED OLEFIN MONOMERS

[75] Inventors: Sam Richard Turner; Peter Borden Mackenzie, both of Kingsport; Allan Scott Jones, Limestone; Jason Patrick McDevitt, Wake Forest; Christopher Moore Killian, Gray; James Allen Ponasik, Jr., Kingsport, all of Tenn.

[73] Assignee: Eastman Chemical Company, Kingsport, Tenn.

[21] Appl. No.: 09/028,433

[22] Filed: Feb. 24, 1998

Related U.S. Application Data

[60] Provisional application No. 60/038,501, Feb. 25, 1997, provisional application No. 60/049,525, Jun. 13, 1997, provisional application No. 60/052,475, Jul. 14, 1997, provisional application No. 60/052,476, Jul. 14, 1997, and provisional application No. 60/052,477, Jul. 14, 1997.

[51] Int. Cl.$^7$ ........................................................ C08F 24/00
[52] U.S. Cl. ........................ 526/269; 526/266; 526/270; 526/314
[58] Field of Search ........................... 526/269, 270, 526/266, 314

[56] References Cited

U.S. PATENT DOCUMENTS

| | | |
|---|---|---|
| 2,570,601 | 10/1951 | Schmerling . |
| 4,011,282 | 3/1977 | Bacskai . |
| 4,772,666 | 9/1988 | Just ......................................... 525/185 |
| 4,897,498 | 1/1990 | Monnier et al. . |
| 4,904,744 | 2/1990 | Gergen et al. . |
| 4,970,294 | 11/1990 | Drent et al. . |
| 5,019,635 | 5/1991 | Blevins et al. . |
| 5,082,956 | 1/1992 | Monnier et al. . |
| 5,250,743 | 10/1993 | Boaz et al. . |
| 5,310,839 | 5/1994 | Blevins et al. . |
| 5,315,019 | 5/1994 | Phillips et al. . |
| 5,393,867 | 2/1995 | Matayabas et al. . |
| 5,406,007 | 4/1995 | Falling . |
| 5,434,314 | 7/1995 | Matayabas, Jr. et al. . |
| 5,466,759 | 11/1995 | Tustin . |
| 5,466,832 | 11/1995 | Matayabas, Jr. et al. . |
| 5,502,137 | 3/1996 | Matayabas, Jr. et al. . |
| 5,516,739 | 5/1996 | Barborak et al. . |
| 5,536,851 | 7/1996 | Monnier . |
| 5,536,882 | 7/1996 | Matayabas, Jr. et al. . |
| 5,567,527 | 10/1996 | Webster ................................. 428/412 |
| 5,571,880 | 11/1996 | Alt et al. . |
| 5,591,874 | 1/1997 | Puckette et al. . |
| 5,608,034 | 3/1997 | Falling et al. . |
| 5,681,969 | 10/1997 | Nolen et al. . |
| 5,714,556 | 2/1998 | Johnson et al. . |

FOREIGN PATENT DOCUMENTS

| | | |
|---|---|---|
| 345854 | 5/1989 | European Pat. Off. . |
| 360358 | 9/1989 | European Pat. Off. . |
| 400719 | 5/1990 | European Pat. Off. . |
| 0729983 | 2/1996 | European Pat. Off. . |
| 0729968 | 3/1996 | European Pat. Off. . |
| 0745607 | 5/1996 | European Pat. Off. . |
| 0747400 | 6/1996 | European Pat. Off. . |
| WO 96 26224 | 8/1996 | WIPO . |
| WO 96/23010 | 9/1996 | WIPO . |
| WO 96/27621 | 9/1996 | WIPO . |
| WO 98 03559 | 1/1998 | WIPO . |
| WO 98 27214 | 6/1998 | WIPO . |
| WO 98 30609 | 7/1998 | WIPO . |
| WO 98 30610 | 7/1998 | WIPO . |
| WO 98 30612 | 7/1998 | WIPO . |

OTHER PUBLICATIONS

Asahara et al., Seisan–Kenkyu (1973), 25(7), 297–9.
L. K. Johnson et al, J. Am. Chem. Soc., 1995, 117, 6414.
L. K. Johnson et. al., J. Am. Chem. Soc., 1996, 118, 267.
C. M. Killian et al., J. Am. Chem. Soc., 1996, 118, 11664.
W. E. Bissinger et al., J. Am. Chem. Soc., 1947, 69, 2955.
P. Rempp et al., Polymer Synthesis, Huthig & Wepf, $2^{nd}$ ed., Basel (1991), pp. 144–152.
Drent et al., J. Organomet. Chem., 1991, 417, 235.
Sen et al., J. Am. Chem. Soc., 1982, 104, 3520.
Organometallics, 1984, 3, 866.
J. Organomet. Chem., 1991, 417, 235.
Brookhart et al., J. Am. Chem. Soc., 1992, 114, 5894.
Brookhart et al., J. Am. Chem. Soc. 1994, 116, 3641.
Nozaki et al., J. Am. Chem. Soc. 1995, 117, 9911.
Sugimoto et al, Chemical Abstracts, vol. 80, No. 2, Jan. 14, 1974, Abstract No. 3830h, Polymerisation of Vinyl Ethylene Carbonate and Polymer Reaction, XP–002067862.
Koichi, Patent Abstracts of Japan, vol. 097, No. 002, Feb. 28, 1997, Publication No. 08283523, Publication date Oct. 29, 1996.
Mitsuo, Patent Abstracts of Japan, vol. 015, No. 450, Nov. 15, 1991, Publication No. 03192116, Publication Date Aug. 22, 1991.

*Primary Examiner*—Fred Zitomer
*Attorney, Agent, or Firm*—Harry J. Gwinnell; Bernard J. Graves; Matthew W. Smith

[57] ABSTRACT

Homopolymers of olefin monomers having polar functional groups, and copolymers of these monomers with each other and with non-polar olefins and optionally carbon monoxide are disclosed. The polymers can be prepared by contacting the corresponding monomers with a transition metal catalyst under comparatively mild conditions; this preserves at least some of the polar functional groups in the resulting polymer. The polymers are suitable for processing in conventional extrusion processes, and can be formed into high barrier sheets or films, or low molecular weight resins for use in synthetic waxes in wax coatings or as emulsions.

29 Claims, No Drawings

POLYMERS CONTAINING FUNCTIONALIZED OLEFIN MONOMERS

CROSS-REFERENCE TO RELATED APPLICATIONS

This Application claims the benefit under 35 U.S.C. § 119 (e) of

Provisional Application Ser. No. 60/038,501, filed Feb. 25, 1997;

Provisional Application Ser. No. 60/049,525, filed Jun. 13, 1997;

Provisional Application Ser. No. 60/052,475, filed Jul. 14, 1997;

Provisional Application Ser. No.60/052,476, filed Jul. 14, 1997; and

Provisional Application Ser. No. 60/052,477, filed Jul. 14, 1997.

FIELD OF THE INVENTION

The present invention is directed to polymers containing units of certain functionalized or polar monomers, wherein at least some of the functional groups remain intact in the polymer. These polymers may optionally contain non-polar monomer units and carbon monoxide monomer units. The present invention is also directed to the processes of making these homopolymers and copolymers using a transition metal complex coordinated by a bidentate ligand having donor atoms selected from phosphorus and nitrogen. The polymers have a wide variety of applications, such as extrusion coating onto paper, films, and molding plastics.

BACKGROUND OF THE INVENTION

Plastics and elastomers derived from olefins are used in numerous diverse applications, from trash bags to fibers for clothing. Olefin polymers are used, for instance, in injection or compression molding applications, such as extruded films or sheeting, as extrusion coatings on paper, such as photographic paper and thermal and digital recording paper, and the like. Constant improvements in catalysts have made it possible to better control polymerization processes, and thus influence the properties of the bulk material. Increasingly, efforts are being made to tune the physical properties of plastics for lightness, strength, resistance to corrosion, permeability, optical properties, and the like, for particular uses. In addition to chain length and branching, the incorporation of monomers containing functional groups, such as ethers and esters, offers an opportunity to further modify and control the properties of the bulk material. For example the early transition metal catalyst systems (i.e., Group IV) tend to be intolerant to such functional groups, which often causes catalyst deactivation. Accordingly, there is a need for a catalytic process for polymerizing olefins containing functional groups that is more robust than those previously known in the art.

Conventional low density polyethylenes are readily prepared in high temperature, high pressure polymerizations using peroxide initiators. These high pressure free radical systems can also be used to prepare ethylene copolymers containing functional vinyl monomers, but it is important to note that only a small number of monomers can be polymerized in this high energy (e.g. 200° C., 30K psi) process, i.e., vinyl acetate and methyl acrylate.

Certain transition metal catalysts, such as those based on titanium compounds (e.g. $TiCl_3$ or $TiCl_4$) in combination with organoaluminum cocatalysts, are used to make high density polyethylene and linear low density polyethylenes (HDPE and LLDPE, respectively), as well as poly-α-olefins such as polypropylene. These so-called "Ziegler-Natta" catalysts are quite sensitive to oxygen, sulfur and Bronsted acids, and thus generally cannot be used to make olefin copolymers with functional vinyl monomers having oxygen, sulfur, or Bronsted acids as functional groups.

Recent advances in olefin polymerization catalysis include the following:

L. K. Johnson et al., *J. Am. Chem. Soc.*, 1995, 117, 6414 describes the polymerization of olefins such as ethylene, propylene, and 1-hexene using Pd(II) and Ni(II)-based catalysts;

L. K. Johnson et al., *J. Am. Chem. Soc.*, 1996, 118, 267 describes the copolymerization of ethylene and propylene with certain alkyl acrylates and methyl vinyl ketone using Pd(II)-based catalysts;

C. M. Killian et al., *J. Am. Chem. Soc.*, 1996, 118,11664 describes the preparation of olefin homo- and block copolymers from propylene, 1-hexene, and 1-octadecene using a Ni(II)-α-diimine catalyst and a methylaluminoxane cocatalyst;

L. K. Johnson et al., WO Patent Application 96/23010 discloses the homo- and copolymerization of ethylene, acyclic olefins, and selected cyclic olefins (e.g., cyclopentene) and optionally including selected unsaturated acids or esters such as acrylic acid or alkyl acrylates;

Certain metallocene catalysts are also known to polymerize olefins, such as described in L. Resconi et al., European Patent Application EP 0 729 968 A1 (1996), Y. Abe et al, European Patent application EP 0 729 983 A2 (1996), D. L. Beach et al., World Patent Application WO 96/27621(1996), H. G. Alt et al., U.S. Pat. No. 5,571,880 (1996), H. G. Alt et al., European Patent Application EP 0 745 607 A2 (1996) assigned to Phillips Petroleum Company, and T. Kiyota et al., European Patent Application EP 0 747 400 A1 (1996) assigned to Sumitomo Chemical Company Ltd.

Ziegler-Natta and metallocene catalyst systems, however, have the drawback that they cannot generally be used in olefin polymerization reactions with functionalized monomers. It is known in the art that homogeneous single site transition metal catalysts generally allow for specific control of catalyst activity through variation of the electronic and steric nature of the ligand. Homogeneous catalysts are known to offer several advantages over heterogeneous catalysts, such as decreased mass transport limitations, improved heat removal, and narrower molecular weight distributions. Therefore, it is also desirable that any catalyst system for polymerizing functionalized olefin monomers be capable of operating under homogenous conditions.

None of the references described above teach the copolymerization of olefins with 3,4-epoxy-1-butene (herinafter "epoxybutene"), epoxybutene derivatives, and analogs thereof. Epoxybutene is a readily available compound containing two reactive groups: a double bond and an epoxide. By reaction at one or both groups, epoxybutene can easily be converted into a host of additional olefin containing compounds.

The preparation of epoxybutene and derivatives thereof, and examples of the same, have previously been described in numerous references, including, but not limited to, U.S. Pat. Nos. 4,897,498; 5,082,956; 5,250,743; 5,315,019; 5,406,007; 5,466,832; 5,536,851; 5,591,874; and in U.S. patent application Ser. No. 08/642,544, U.S. Pat. No. 5,681, 969 incorporated herein by reference. Reaction at one or both of these sites affords a host of olefinic derivatives, many of which contain versatile functional groups. Polymerization of epoxybutene has been performed using traditional thermal and free radical initiated reactions, however the pendant epoxide group often does not survive the reaction conditions.

Advances in the polymerization of epoxybutene and its derivatives include the following:

L. Schmerling et al., U.S. Pat. No. 2,570,601 describes the thermal homopolymerization of epoxybutene and the thermal copolymerization of epoxybutene and various vinyl monomers, such as vinyl chloride, vinyl acetate, acrylonitrile, butadiene and styrene.

Polymerization reactions of epoxybutene, in which the epoxide ring is opened to afford polyethers, are known, such as those described in: S. N. Falling et al., U.S. Pat. No. 5,608,034 (1997); J. C. Matayabas, Jr., S. N. Falling, U.S. Pat. No. 5,536,882 (1996); J. C. Matayabas, Jr. et al., U.S. Pat. No. 5,502,137 (1996); J. C. Matayabas, Jr., U.S. Pat. No. 5,434,314 (1995); J. C. Matayabas, Jr., U.S. Pat. No. 5,466,759 (1995); and J. C. Matayabas, Jr., U.S. Pat. No. 5,393,867 (1995).

W. E. Bissinger et al., *J. Am. Chem. Soc.*, 1947, 69, 2955 describes the benzoyl peroxide initiated free radical polymerization of vinyl ethylene carbonate, a derivative of epoxybutene.

If the double bond in these compounds could be utilized in an olefin polymerization reaction, so that epoxybutene (or a derivative thereof) could be enchained with other non-polar olefin monomer units, such that at least some of the original polar functionality (i.e., the carbonate in vinyl ethylene carbonate or the epoxide in epoxybutene) remained intact, a copolymer could be produced containing functional groups that would provide for a new polymeric material useful by itself or that could be further derivatized by reaction of the pendant functional groups.

Cationic polymerization of vinyl ethers (such as 2,3-dihydrofuran) is known using Lewis acids or proton-containing acids as initiators. These monomers have been shown to polymerize violently through a cationic polymerization mechanism—often at rates orders of magnitude faster than anionic, or free radical polymerizations—in the presence of both Bronsted and Lewis acids (P. Rempp and E. W. Merrill, "Polymer Synthesis," Hüthig & Wepf, $2^{nd}$ ed, Basel (1991), pp 144–152). Olefin addition polymerization of vinyl ethers via a transition metal mediated insertion mechanism has not been demonstrated.

In addition, the synthesis of alternating copolymers and terpolymers of olefins and carbon monoxide is of high technical and commercial interest. New polymer compositions, as well as new processes to make polymers derived from olefins and carbon monoxide, are constantly being sought. Perfectly alternating copolymers of α-olefins and carbon monoxide can be produced using bidentate phosphine ligated Pd(II) catalyst systems (Drent et al., *J Organomet. Chem.*, 1991, 417, 235). These semi-crystalline copolymers are used in a wide variety of applications including fiber and molded part applications. These materials are high performance polymers having high barrier and strength, as well as good thermal and chemical stability.

Alternating copolymerization of olefins and CO using Pd(II) catalysts has been demonstrated by Sen et al., *J. Am. Chem. Soc.*, 1982, 104, 3520; and *Organometallics*, 1984, 3, 866, which described the use of monodentate phosphines in combination with $Pd(NCMe)_4 (BF_4)_2$ for the in situ generation of active catalysts for olefin/CO copolymerization. However, these catalyst systems suffer from poor activities and produce low molecular weight polymers. Subsequent to Sen's early work, Drent and coworkers at Shell described the highly efficient alternating copolymerization of olefins and carbon monoxide using bisphosphine chelated Pd(II) catalysts. Representative patents and publications include: U.S. Pat. No. 4,904,744 (1990); Eur. Pat. Appl. EP 400,719 (1990); Eur. Pat. Appl. EP 360,358 (1990); Eur. Pat. Appl. EP 345,854 (1989); *J. Organomet. Chem.*, 1991, 417, 235; and U.S. Pat. No. 4,970,294 (1990).

Recent advances in olefin/CO copolymerization catalysis include the following:

Brookhart et al., *J. Am. Chem. Soc.*, 1992, 114, 5894, described the alternating copolymerization of olefins and carbon monoxide with Pd(II) cations ligated with 2,2'-bipyridine and 1,10-phenanthroline;

Brookhart et al., *J. Am. Chem. Soc.* 1994, 116, 3641, described the preparation of a highly isotactic styrene/CO alternating copolymer using $C_2$-symmetric Pd(II) bisoxazoline catalysts;

Nozaki et al., *J. Am. Chem. Soc.* 1995, 117, 9911, described the enantioselective alternating copolymerization of propylene and carbon monoxide using a chiral phosphine-phosphite Pd(II) complex.

None of these references teach the copolymerization of olefins with carbon monoxide and functionalized olefins, like epoxybutene and related compounds.

Thus, it would be advantageous to have a homogeneous, single site, transition metal catalyst system that would allow for olefin polymerization of functionalized olefin monomers, such as 3,4-heteroatom substituted olefins, in solution, slurry phase or gas phase, or copolymerization reactions of functionalized olefin monomers with nonpolar monomers and, optionally, with carbon monoxide, under mild reaction conditions.

SUMMARY OF THE INVENTION

The present invention is directed to polymers containing functionalized or polar monomers, such as 3,4-heteroatom substituted olefins. These polymers may be homopolymers, copolymers, terpolymers, etc., and include homopolymers of the functionalized monomer, copolymers of two or more functionalized monomers, copolymers containing the functionalized monomers with other olefins, such as ethylene, propylene, cyclopentene, norbornene, vinyl acetate, or methyl acrylate, and also copolymers containing monomer units derived from functionalized olefins, other olefins, and carbon monoxide.

In general, the polymers of the present invention are comprised of groups of the following formula (L):

wherein F represents one or more functionalized olefin monomer units or monomer units derived from monomers selected from 3,4-heteroatom substituted olefins of formula XV, as described below, or 2,5-dihydrofuran, N represents one or more other olefin monomer units, CO represents carbon monoxide, and subscripts S, T, and V represent the respective molar fractions of the monomer units, i.e., S+T+V=1, with the further proviso that S>0 and V≦0.5. It should also be appreciated that each polymer may contain more than one type or structure of monomer N or F.

More particularly, the present invention relates to polymers such as homopolymers and copolymers of certain 3,4-heteroatom substituted olefins as well as 2,5-dihydrofuran. "Analog" as used herein, denotes a species having a heteroatom other than oxygen (such as sulfur) at the oxygen postion in epoxybutene and derivatives thereof; "derivatives" as used herein denotes those compounds prepared from epoxybutene by reaction at the epoxide group, leaving at least one functionalized group remaining in the resultant olefin (other than the double bond). Derivatives of epoxybutene include 3,4-diheteroatom substituted olefins in general and also cyclic ethers such as 2,5-dihydrofuran. These monomers may form homopolymers, copolymers with each other and with other functionalized olefin monomers such as acrylates and vinyl acetates, copolymers with nonpolar olefins, such as ethylene, propylene, cyclobutene, norbornene, and the like, copolymers with nonpolar olefins and carbon monoxide, and copolymers with polar olefins, such as acrylates or vinyl acetates and carbon monoxide.

The present invention is also directed to methods for preparing these polymers. Preferred polymerization catalysts are those having a Group 8–10 transition metal (in the +2 oxidation state) coordinated by a bidentate ligand having donor atoms selected from phosphorus and nitrogen, such as bis-nitrogen-ligated, amidate-imidate-ligated, bis-amidate-ligated, bis-imidate-ligated, bis-thioimidate ester-ligated, α-diimine-ligated transition metal complexes, or the reaction product of $Pd(OAc)_2$, 1,3-bis(diphenylphosphino)propane, $Ni(ClO_4)_2 \cdot 6H_2O$, and 1,4-naphthoquinone, as the reaction catalyst.

The polymers of this invention have a wide variety of uses, including extrusion coatings on paper, paperboard, films, and the like, injection molding, precursors for other polymers, and numerous other uses.

In a particularly preferred embodiment, the polymerization reactions of the present invention can be carried out in solution, as a solvated or nonsolvated slurry, and in slurries using the functionalized olefin monomer as the polymerization medium, and under mild conditions, such as at temperatures near room temperature and at pressures near atmospheric. The processes and catalysts of the present invention can provide for a polymer wherein significant portions of the polar functional groups of the corresponding monomers survive polymerization intact. The properties of the polymers may be varied widely based on the identity of the functionalized olefin monomer or monomers selected, and the extent to which they are incorporated into the polymer with other monomer units, to make, for instance, high molecular weight resins useful in conventional extrusion processes for high barrier sheets and films, low molecular weight resins useful as synthetic waxes for wax coatings or as emulsions, or oligomers useful by themselves or as intermediates for further reactions.

Recent advances in butadiene epoxidation technology by Monnier and co-workers have made epoxybutene and its derivatives available as new, low-cost monomers. See, for example, U.S. Pat. Nos. 4,897,498; 4,950,773; 5,081,096; 5,117,012; 5,138,077; 5,189,199; 5,264,595; 5,288,910; 5,312,931; and 5,362,890; incorporated herein by reference. The ability to incorporate 3,4-heteroatom substituted olefins into homopolymers and copolymers, and into copolymers with ethylene and other olefins, and copolymers with carbon monoxide, offers important new advantages for polymer design and property control.

Thus, it is an object of the present invention to provide a method of incorporating functionalized olefin monomers into homopolymers and copolymers in a way that maintains at least some of the functional groups intact in the resulting polymer.

Another object of the invention is to provide a method of incorporating functionalized olefin monomers into copolymers comprising other olefin monomer units, which may also contain carbon monoxide monomer units.

An additional object of the invention is to provide olefin polymers having novel combinations of physical properties, particularly barrier properties in combination with weight and strength properties.

A further object of the invention is to provide for a transition metal catalyzed olefin or olefin and carbon monoxide polymerization reaction that can occur in solution, in a slurry, or in the gas phase sunder mild conditions, and does not require peroxide initiators.

Yet another object of the invention is to provide an olefin or olefin and carbon monoxide polymerization reaction that allows for the incorporation of epoxybutene and the diverse compounds that can be derived from epoxybutene, into the polymer chain while maintaining at least some of the functional groups of these compounds intact in the resulting polymers.

These and other objects, features, and advantages of the present invention will become apparent from the following detailed description of the invention, preferred embodiments, and specific examples.

DETAILED DESCRIPTION OF THE INVENTION

The present invention relates to homopolymers and copolymers comprising functionalized olefin monomer units that are formed by the olefin addition polymerization of monomers of formula XV as defined herein, or 2,5-dihydrofuran in the presence of Group 8–10 transition metal catalysts, in particular Fe(II), Pd(II), Ni(II), Ru(II), and Co(II) catalysts, more particularly Pd(II) and Ni(II) catalysts, coordinated by a bidentate ligand having donor atoms selected from phosphorus, nitrogen, and mixtures thereof, as discussed in more detail below. In a preferred embodiment, at least some of the functional groups present on the monomers remain intact in the resulting polymer.

As used hereinafter, the terms "monomer" or "olefin monomer" refer to the olefin or other monomer compound before it has been polymerized; the term "monomer units" refer to the moieties of a polymer that correspond to the monomers after they have been polymerized. The terms "polar monomer," "functionalized olefin" and "functionalized monomer," unless otherwise noted, are used interchangably herein and refer to olefins containing at least one heteroatom such as N, O, S, P, and the like, including but not limited to olefins substituted with oxirane groups, 2,5-dihydrofuran, mono- or di-oxy-substituted butenes, etc., whether as a monomer or a monomer unit of a polymer. The term "polymer" refers to a species comprised of ten or more monomer units, which may be the same or different, and includes copolymers, terpolymers, and the like. The term "oligomer", in contrast, refers to a species having from two to nine monomer units. As used herein, the term "copolymer" refers to a polymer having two or more different monomer units.

The invention is particularly directed to the incorporation of functionalized olefins of the following structure (XV):

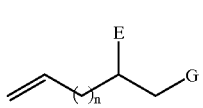

XV wherein E and G represent the same or different divalent heteroatoms selected from oxygen, nitrogen, and sulfur, which are in turn bound to a hydrocarbyl or substituted hydrocarbyl radical, or are linked via a divalent organic linking group; and n is 0 or an integer from 1–20; or 2,5-dihydrofuran.

For example, in addition to epoxybutene, epoxybutene derivatives and analogs, compounds represented by XV include vinyl ethylene carbonate; vinyldioxolanes such as 4-vinyl-2,2-dimethyl-1,3-dioxolane; vinyl dioxanes; other epoxy-substituted alkenes, such as epoxypentene, and their derivatives formed by ring opening of the oxirane ring, such as mono- or di-acetoxybutenes; mono- or di-hydroxybutenes; mono- or di-alkoxybutenes, etc.; and butene thiiranes.

The copolymers may contain only these functionalized olefin monomer units, or may be copolymers that also contain monomer units formed by polymerization of other monomers, including monomers like ethylene, propylene, cyclopentene, norbornene, vinyl acetate, methyl acrylate, etc., and combinations thereof. The present invention is directed to, inter alia, copolymers of: ethylene and 2,5-dihydrofuran; ethylene and vinyl ethylene carbonate; cyclopentene and vinyl ethylene carbonate; ethylene and 2,2-dialkyl-4-vinyldioxolane; ethylene and di-oxy-substituted butenes, such as 3,4-diacetoxybutene, 3,4-dialkoxybutene, 3,4-dihydroxybutene, or 3,4-diphenoxybutenes; ethylene and mixed hydroxy, alkoxy, or acetoxy compounds; and ethylene and epoxybutene. These copolymers can additionally comprise monomer units formed from carbon monoxide, formed by additionally contacting carbon monoxide with the polymerization catalyst and the other monomers. Interestingly, 2,3-dihydrofuran homopolymerizes cationically in the presence of ethylene and a transition metal catalyst of the present invention, and is not within the scope of the present invention.

Copolymers of epoxybutene, epoxybutene derivatives, and epoxybutene analogs, such as vinyl ethylene carbonate, 2,2-dimethylvinyl dioxolane are suitable for uses currently engaged by EVOH (ethylene-vinyl alcohol polymers) and PVOH (poly(vinyl alcohol)) resins, such as high barrier films for packaging. Copolymers of 2,5-dihydrofuran are suitable for applications wherein enhanced glass transition temperature ($T_g$) is required, such as injection molding for automotive and packaging applications.

The polymers and oligomers of the present invention may be characterized as containing one or more types of functionalized olefin monomer units F, as described above, optionally bonded with one or more other olefin monomer units N and optionally including monomer units obtained by incorporating carbon monoxide monomer units into the polymer. Thus, the present invention provides a polymer prepared by olefin addition polymerization comprising groups of the formula (L):

—[F]$_S$—[N]$_T$—[CO]$_V$—     (L)

wherein F is a monomer unit derived from at least one compound of the formula XV;

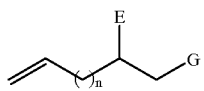

XV wherein E and G represent the same or different divalent heteroatoms selected from oxygen, nitrogen, and sulfur, which are in turn bound to a hydrocarbyl or substituted hydrocarbyl radical, or are linked via a divalent organic linking group; and n is 0 or an integer from 1–20;

or F is a monomer unit derived from 2,5-dihydrofuran; wherein N is selected from (i) a monomer unit derived from an olefin monomer selected from at least one compound of formula (I):

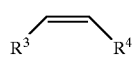

I wherein $R^3$ and $R^4$ are independently hydrogen or hydrocarbyl, or $R^3$ and $R^4$ collectively form a bridging group K, wherein K is hydrocarbyl, to provide one or more non-aromatic unsaturated carbocyclic rings;

(ii) a monomer unit derived from a monomer selected from methacrylic acid, methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, styrene, α-methylstyrene, glycidyl methacrylate, carbodiimide methacrylate, alkyl crotonates, and vinyl acetate; or (iii) a monomer unit derived from a $C_2$–$C_{20}$ alkene substituted one or two times with a group selected from $C_1$–$C_{10}$ alkoxy, hydroxy, phenoxy, or acetate; and CO is a carbon monoxide monomer unit, S, T, and V represent the mole fraction of the respective monomer units and sum to one, with the proviso that S>0, and V≦0.5.

It is important to note that more than one monomer (F) can be utilized, and that more than one type of other olefin monomer (N) can be utilized. Further, the use of carbon monoxide is optional. Finally, the above formula (L) does not imply any particular order of the monomer units or linearity of the chain. That is, the polymer may be a block or random (in the absence of CO) copolymer or an alternating copolymer. Furthermore, the monomers can be enchained in different ways, so that the polymers may be linear or branched, depending on polymerization conditions. As will be appreciated, the catalysts of the type employed herein allow for multiple modes of enchainment, including but not limited to 1,2-, 2,1-, and 1,3-enchainment, as a result of migration of the catalyst along the polymer chain between monomer insertion events.

Preferred compounds of formula XV include the following:

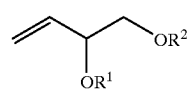

II

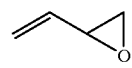

III

IV

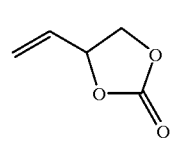

V

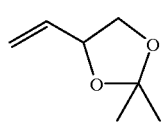 VI
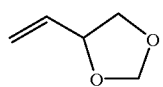 VII
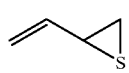 VIII
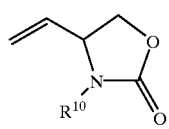 IX
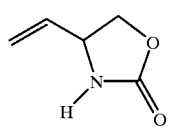 X
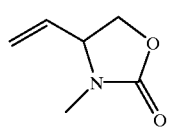 XI
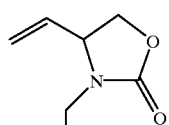 XII
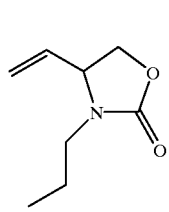 XIII
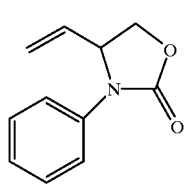 XIV
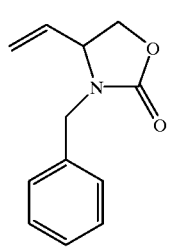 XVI
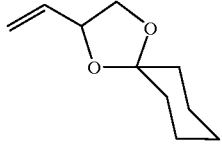 XVII
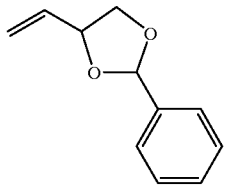 XVIII XXVII 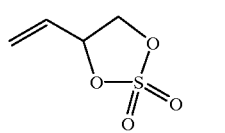
XXVIII 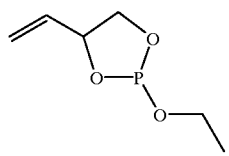
XXIX 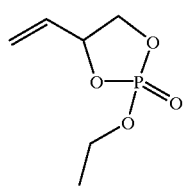
XXX 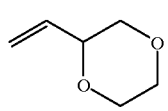
XXXI 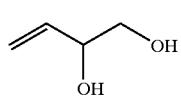
XXXII 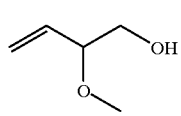
XXXIII 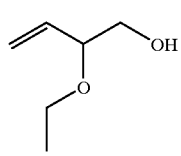
XXXIV 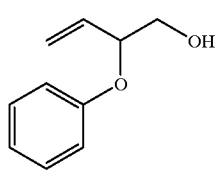
XXXV 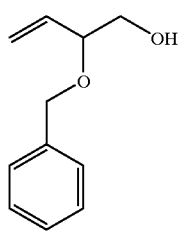
XXXVI 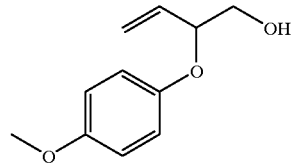
XXXVII 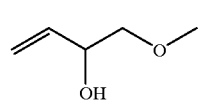
XXXVIII 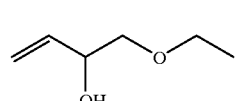
XXXIX 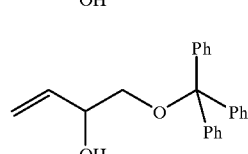
XL 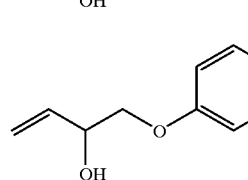
XLI 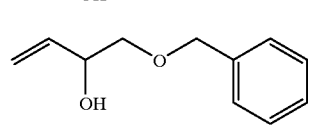
XLII 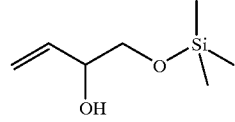
XLIII 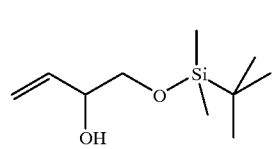
XLIV 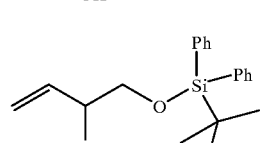
XLV 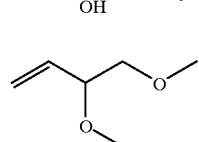
XLVI 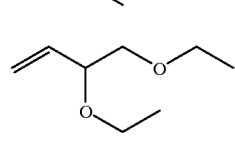
XLVII 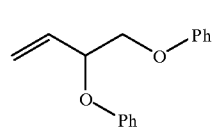

-continued
XLVIII
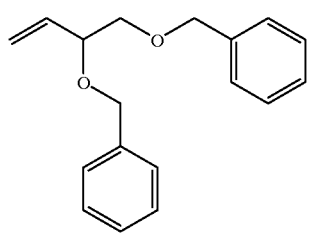
XLIX
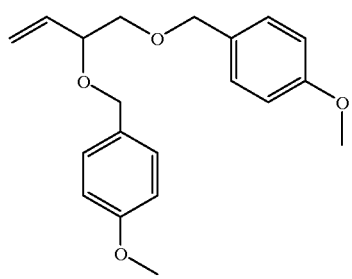
LXVIII
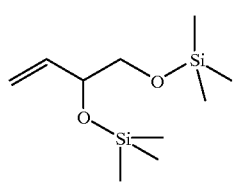
LXIX
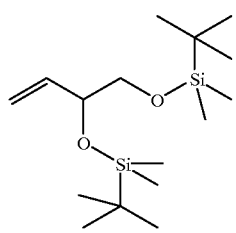
LXX
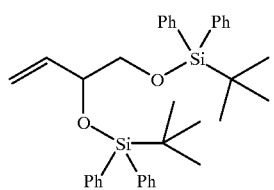
LIII
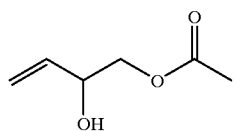
LIV
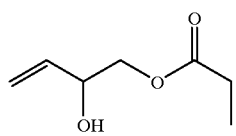
LV
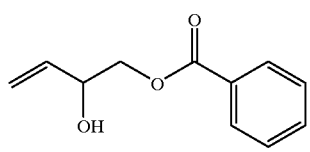
-continued
LVI
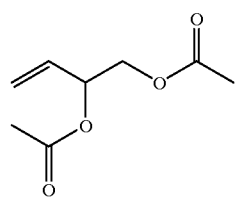
LVII
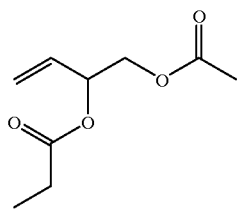
LVIII
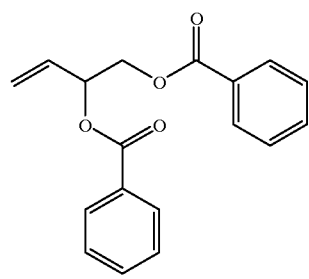
LIX
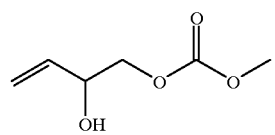
LX
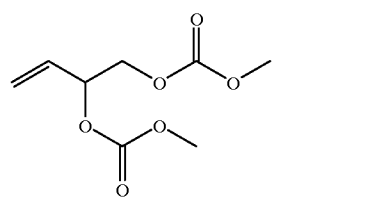
LXI
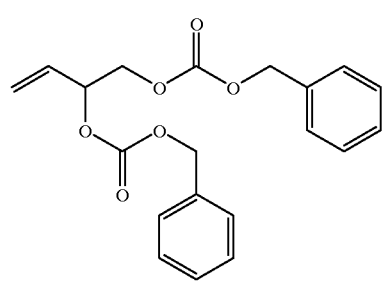
LXII -continued

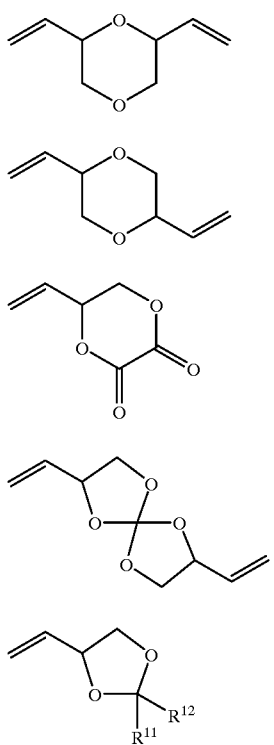

LXIII

LXIV

LXV

LXVI

LXVII wherein $R^1$ and $R^2$ are independently hydrogen, hydrocarbyl, substituted hydrocarbyl, heteroatom connected hydrocarbyl, or $R^1$ and $R^2$ collectively form a bridging group Y, wherein Y is hydrocarbyl, substituted hydrocarbyl, heteroatom connected hydrocarbyl, or heteroatom connected substituted hydrocarbyl; $R^{10}$, $R^{11}$, and $R^{12}$ are independently hydrogen, hydrocarbyl, or substituted hydrocarbyl; and Ph is phenyl.

Particularly preferred polymers or copolymers of this embodiment contain functionalized monomers II, III, and IV, with most preferred being II. Particularly preferred examples of II are vinyl ethylene carbonate (VEC) and 2,2-dimethyl vinyl dioxolane (DMVDO).

This embodiment relates more particularly to homopolymers of formula XV or 2,5-dihydrofuran, copolymers of formula XV or 2,5-dihydrofuran, and copolymers containing epoxybutene, epoxybutene derivatives, and analogs thereof and at least one additional functionalized olefin monomer unit, and methods of preparing such homopolymers and copolymers.

In a further embodiment of the polymers of the invention, a copolymer is provided containing units of olefin monomer 1, "N" in formula (L) above, shown below,

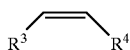

I wherein $R^3$ and $R^4$ are independently hydrogen or hydrocarbyl, or $R^3$ and $R^4$ collectively form a bridging group K, wherein K is hydrocarbyl, to provide one or more non-aromatic unsaturated carbocyclic rings, such as cyclopentene, and units of at least one functionalized olefin monomer, produced by the transition metal catalyzed olefin addition polymerization of a corresponding olefin monomer I with one or more corresponding functionalized olefin monomers selected from the group consisting of olefin monomers II, III, IV, VIII, and IX:

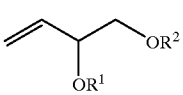

II

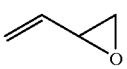

III

IV

VIII

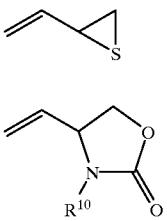

IX which have been described in more detail above, more preferably the polymerization of non-polar olefin I with a functionalized olefin monomer of formula II, III, or IV. In a preferred embodiment of this second embodiment, either VEC and DMVDO are present as functionalized monomers. In general, the number of different functionalized monomer units and the number of different non-polar monomer units are independent of each other. Thus, this embodiment includes, as specific examples, a polymer comprised of vinyl ethylene carbonate, epoxybutene, and ethylene monomer units, a polymer comprised of epoxybutene, DMVDO, ethylene, and cyclopentene monomer units, a polymer comprised of epoxybutene, ethylene, and cyclopentene monomer units, and a polymer comprised of vinyl ethylene carbonate and ethylene.

Of a third embodiment of the polymers of the present invention, a polymer is provided containing at least one of the aforementioned functionalized monomers (II), (III), (IV), (VIII), and (IX), at least one other monomer described by I above, and carbon monoxide. With respect to formula (L) above, this embodiment has the molar ratios $0<S<1$, $0<T<1$, $0<V\leq 0.5$, and $S+T+V=1$. Without wishing to be bound by theory, it is believed that V cannot be greater than 0.5 because there cannot be adjacent carbon monoxide monomer units. As noted above, the monomers may be enchained in different ways. Accordingly, as a further embodiment of the present invention, there is provided a polymer comprised of monomer units of the formula (B):

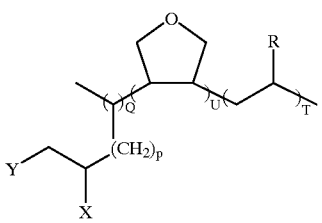

B wherein Q, U, and T, representing the mole fraction of the corresponding monomer unit, range from 0 to 1 and sum to 1, Q+U>0, p ranges from 0 to 10;

R is hydrogen or hydrocarbyl;

X and Y are independently OAc, OPh, O-alkyl, OH, SH, S-alkyl, CN, or $OR_f$, wherein $R_f$ is fluorinated hydrocarbyl and Ac is acyl; or X and Y together can form bridging group J, wherein J is —O—, —S—, —N($R^{10}$) CO—O—, wherein $R^{10}$ is hydrogen, hydrocarbyl, or substituted hydrocarbyl,

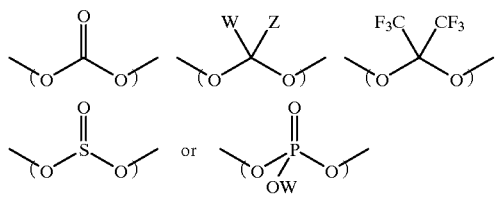

wherein W and Z are independently H, hydrocarbyl, or substituted hydrocarbyl.

In a further embodiment, there are provided copolymers comprised of the following structure (C):

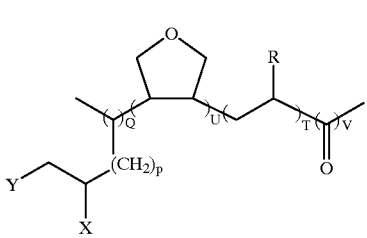

C wherein Q, U, T, p, X, Y, and R have been defined previously and V represents the mole fraction of carbon monoxide units in the copolymer and V≦0.5, Q+U>0, 0≦T<1, and the subscripts, representing the molar fraction of each monomer unit, sum to 1.

In a particularly preferred embodiment of the first, second, and third embodiments outlined above, either 2,2-dimethyl vinyl dioxolane (DMVDO) and vinyl ethylene carbonate (VEC) monomer units are present in the final polymer.

The present invention is also directed to methods for preparing these polymers by contacting at least one functionalized olefin monomer, preferably a 3,4-heteroatom substituted olefin such as epoxybutene, derivatives and analogues thereof, and optionally other olefin monomers (e.g., structure (I) above), such as ethylene, in the presence or absence of carbon monoxide, with a suitable polymerization catalyst, and conducting an olefin addition polymerization to produce a polymer. It is important to note that the olefin addition polymerization results in at least some of the functional groups on the functionalized olefin remaining intact in the resultant polymer.

Thus, as a further embodiment of this invention, there is provided a process for preparing a polymer comprised of groups of the formula (L):

$$\text{—[F]}_S\text{—[N]}_T\text{—[CO]}_V\text{—} \tag{L}$$

wherein N is selected from (i) a monomer unit derived from an olefin monomer selected from at least one monomer (I):

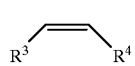

I wherein $R^3$ and $R^4$ are independently hydrogen or hydrocarbyl, or $R^3$ and $R^4$ collectively form a bridging group K, wherein K is hydrocarbyl, to provide one or more non-aromatic unsaturated carbocyclic rings;

(ii) a monomer unit derived from monomers selected from (meth)acrylic acid, methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, styrene, α-methylstyrene, glycidyl methacrylate, carbodiimide methacrylate, alkyl crotonates, vinyl acetate, di-n-butyl maleate, and di-octyl maleate; or (iii) a monomer unit derived from $C_2$–$C_{20}$ alkene substituted one or two times with a group selected from $C_1$–$C_{10}$ alkoxy, hydroxy, phenoxy, or acetate F is a monomer unit derived from at least one compound of the formula XV;

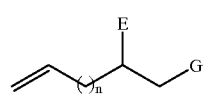

XV wherein E and G represent the same or different divalent heteroatoms selected from oxygen, nitrogen, and sulfur, which are in turn bound to a hydrocarbyl or substituted hydrocarbyl radical, or are linked via a divalent organic linking group;

or F is a monomer unit derived from 2,5-dihydrofuran;

CO is a carbon monoxide monomer unit, S, T, and V represent the mole fraction of the respective monomer units and sum to one, with the proviso that S>0, and V≦0.5;

which comprises contacting said monomers, and optionally CO, with a transition metal selected from Pd(II) and Ni(II), wherein said metal is ligated by a bidentate ligand having donor atoms selected from phosphorus, nitrogen or mixtures thereof.

Polymerization catalysts useful to prepare the polymers of the present invention and used in the process of the present invention are Group 8–10 transition metal complexes coordinated by a bidentate ligand having donor atoms selected from phosphorus and nitrogen, such as bis-nitrogen-ligated, amidate-imidate-ligated, bis-amidate-ligated, bis-imidate-ligated, bis-thioimidate ester-ligated, α-diimine-ligated transition metal complexes, or the reaction product of Pd(OAc)$_2$, 1,3-bis(diphenylphosphino)propane, Ni(ClO$_4$)$_2$·6H$_2$O, and 1,4-naphthoquinone, as the reaction catalyst. Preferred Group 8–10 transition metals are Fe(II), Pd(II), Ni(II), Ru(II), and Co(II), with the more preferred metals being Pd(II) and Ni(II).

In a preferred process, a homopolymer containing monomer units of of formula XV or 2,5-dihydrofuran is produced by contacting a functionalized olefin monomer with one of the aforementioned catalysts and conducting an olefin addition polymerization to produce the homopolymer, wherein the functionalized olefin monomer contains one or more functional groups and at least some of the functional groups remain intact in the homopolymer, or by a copolymer containing monomer units of polar olefins produced by contacting at least two functionalized olefin monomers in the presence of the aforementioned useful catalysts and conducting olefin addition polymerization to produce the copolymer, wherein at least one of the functionalized olefin monomers contains one or more functional groups and at least some of the functional groups remain intact in the copolymer.

The polymerization reactions of the present invention can be carried out in solution, as a solvated or nonsolvated slurry, in slurries using the functionalized olefin monomer as the polymerization medium, or in the gas phase. Reaction conditions may vary from, for instance, –100° C. to 220° C. and from 1 atm to 200 atm, although higher and lower temperatures and pressures may be used, under a suitable atmosphere. A suitable atmosphere depends on the desired product, but may include inert gases such as nitrogen or argon, and reactive gases such as the non-polar olefins ethylene and the like, and also including carbon monoxide. The reactions are preferably carried out from –50° C. to 150° C. in solution or slurry, and more preferably are carried out under mild conditions, such as at temperatures near room temperature and at pressures near atmospheric.

In particular, these homopolymers and copolymers can contain monomer units of polymerized epoxybutene or polymerized epoxybutene derivatives and are produced by polymerizing the corresponding monomers in a solvent or slurry in the presence of a suitable catalyst, such as at least one of the aforementioned transition metal complexes coordinated by a bidentate ligand having donor atoms selected from phosphorus and nitrogen.

In a more preferred process for preparing the polymers containing functionalized olefins involves contacting a catalyst composed of an α-diimine ligated transition metal with at least one olefin monomer from the set II, III, IV, VIII, or IX:

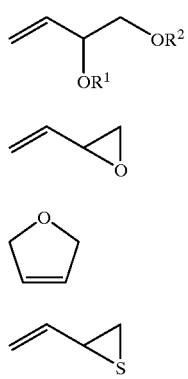

-continued

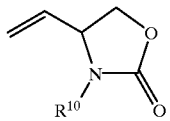

IX which have been previously described in detail above.

Preferable functionalized olefin monomers are those represented by II, III, or IV. This process can also be used to prepare copolymers of the functionalized olefin monomers, and in particular functionalized olefin monomers II, III, or IV with non-polar olefins, such as (I) described above, and optionally functionalized monomers II, III, or IV with non-polar olefins and carbon monoxide. More preferably, the processes are carried out in an inert solvent, such as methylene chloride, toluene, or mixtures thereof, or in one of the olefin monomers as solvent, or as a solvated or non-solvated slurry polymerization, at temperatures from –50° C. to 150° C.

As used herein, the term "divalent organic linking group" refers to a hydrocarbyl or substituted hydrocarbyl.

The term "$C_2$–$C_{20}$ alkene" refers to a $C_2$–$C_{20}$ hydrocarbon having one or more C=C bonds.

A "hydrocarbyl" group means a monovalent or divalent, linear, branched or cyclic group which contains only carbon and hydrogen atoms. Examples of non-bridging hydrocarbyls include the following: $C_1$–$C_{20}$ alkyl; $C_1$–$C_{20}$ alkyl substituted with one or more groups selected from $C_1$–$C_{20}$ alkyl, $C_3$–$C_8$ cycloalkyl or aryl; $C_3$–$C_8$ cycloalkyl; $C_3$–$C_8$ cycloalkyl substituted with one or more groups selected from $C_1$–$C_{20}$ alkyl, $C_3$–$C_8$ cycloalkyl or aryl; $C_6$–$C_{14}$ aryl; and $C_6$–$C_{14}$ aryl substituted with one or more groups selected from $C_1$–$C_{20}$ alkyl, $C_3$–$C_8$ cycloalkyl or aryl. As used herein, the term "aryl" preferably denotes a phenyl, napthyl, or anthracenyl group. When the above groups are substituted, they are preferably substituted from one to four times with the listed groups. Examples of divalent (bridging) hydrocarbyls include: —CH$_2$—, —CH$_2$CH$_2$—, and —CH$_2$CH$_2$CH$_2$—.

A "heteroatom" refers to an atom other than carbon or hydrogen. Preferred heteroatoms include oxygen, nitrogen, phosphorus, sulfur, selenium, arsenic, chlorine, bromine, and fluorine.

A "substituted hydrocarbyl group" means a monvalent or divalent hydrocarbyl group containing one or more heteroatoms; by "carbocyclic ring" is meant a cyclic hydrocarbon; a "substituted carbocyclic ring" means a carbocyclic ring containing one or more heteroatoms; "acyl" means the group —C(O)R, wherein R is selected from hydrogen, hydrocarbyl, or substituted hydrocarbyl.

Suitable substituted hydrocarbyls include $C_1$–$C_{20}$ alkyl or $C_6$–$C_{10}$ aryl substituted with one or more halogen, such as trifluoromethyl; hydroxy; $C_1$–$C_{20}$ alkoxy; $C_3$–$C_8$ cycloalkoxy; sulfhydryl; amino; substituted amino; formyl; cyano; thiocyano; nitro; carboxy; $C_1$–$C_{20}$ carbalkoxy; $C_1$–$C_{20}$ alkanoyloxy; carbamoyl; $C_1$–$C_{20}$ alkanoyl; $C_1$–$C_{20}$ alkylthio; $C_1$–$C_{20}$ alkylsulfonyl; sulfamoyl; $C_1$–$C_{20}$ alkoxycarbonyloxy; $C_1$–$C_{20}$ alkylaminocarbonyloxy; substituted phenyl; phenoxy; substituted phenoxy; phenoxycarbonyl; substituted phenoxycarbonyl; phenylthio; substituted phenylthio; phenylsulfonyl; substituted phenylsulfonyl; benzoyl; substituted benzoyl; phenylsulfonylamino; substituted phenylsulfonylamino; $C_1$–$C_{20}$ alkylsulfonylamino; $C_1$–$C_{20}$ alkylcarbonylamino; phenylcarbonylamino; substituted phenylcarbonylamino; $C_1$–$C_{20}$ alkylaminocarbonylamino; wherein the above definitions of the terms substituted phenyl, substituted phenoxy, substituted phenoxycarbonyl, substituted phenylthio; substituted phenylsulfonyl; substituted benzoyl, substituted phenylsulfonylamino, and substituted phenylcarbonylamino, the phenyl portion of the group is substituted with one or more groups selected from $C_1$–$C_6$ alkoxy, $C_1$–$C_6$ alkyl or halogen; in the terms $C_1$–$C_{20}$ alkoxy, $C_1$–$C_{20}$ carbalkoxy, $C_1$–$C_{20}$ alkanoyloxy, $C_1$–$C_{20}$ alkanoyl, $C_1$–$C_{20}$ alkylthio, $C_1$–$C_{20}$ alkylsulfonyl, $C_1$–$C_{20}$ alkylaminocarbonyloxy, $C_1$–$C_{20}$ alkylsulfonylamino, $C_1$–$C_{20}$ alkylcarbonylamino and $C_1$–$C_{20}$ alkylaminocarbonylamino the alkyl portion of the groups represents straight or branched chain alkyl groups having one to twenty carbon atoms; the terms carbamoyl, sulfamoyl, and substituted amino are used to describe groups having the structures $CON(R_{21})R_{22}$, $SO_2N(R_{21})R_{22}$ and $N(R_{21})R_{22}$, respectively, wherein $R_{21}$, and $R_{22}$ are independently selected from hydrogen, $C_1$–$C_{20}$ alkyl, $C_3$–$C_8$ cycloalkyl, phenyl and substituted phenyl wherein, the term $C_3$–$C_8$ cycloalkyl is used to describe saturated cyclic hydrocarbon radicals containing three to eight carbons and these radicals can be substituted with one or more $C_1$–$C_6$ alkyl, or $R_{21}$ and R22 collectively form a bridging carbocyclic or substituted carbocyclic ring. Examples of divalent substituted hydrocarbyls include: —$CH_2$—, —$CH_2CH_2$—, —$C(O)$—, —$C(O)C(O)$—, —$Si(CH_3)$—, —$S(O)$—, —$S(O)_2$—, —$P(O)(OCH_3)$—, —$C(CH_3)_2$—, —$C(hydrocaryl)_2$— or —$SiPh_2$—.

The term "heteroatom connected hydrocarbyl" as used herein includes hydrocarbyl and substituted hydrocarbyl groups bound via a sulfur, silicon, oxygen, nitrogen, or phosphorous atom; wherein the terms hydrocarbyl and substituted hydrocarbyl are defined as above.

The most preferred functionalized olefin monomers are epoxybutene and derivatives thereof. As used herein, the term "epoxybutene derivatives" (or the phrase "epoxybutene and derivatives thereof", and the like) means compounds derived from epoxybutene by reaction of the epoxy functional group, wherein the double bond of epoxybutene remains intact, and include in particular 3,4-heteroatom substituted olefins of formula XV and cyclic ethers such as 2,5-dihydrofuran. As previously mentioned, for the purposes of the present invention, 2,3-dihydrofuran is specifically excluded from this definition. The preparation of epoxybutene and derivatives thereof is described elsewherein, e.g., the references cited above. Particularly suitable examples of epoxybutene derivatives are those represented by formulas II, and IV, below, in particular vinylethylene carbonate or 2,2-dimethyl-4-vinyldioxolane. Other suitable functionalized olefin monomers include higher homologs of epoxybutene, ethylene episulfides VIII, and heterocyclic compounds of formula IX, shown above.

Other suitable derivatives of epoxybutene are known, for instance those listed in the patents recited in the "Background" section above.

Note that, unless otherwise specified, no stereochemistry is implied in any of the structures depicted or the compounds disclosed herein. Thus, in formula (I) for instance, the stereochemistry about the double bond may be cis or trans, and a racemic mixture may be used in the polymerization.

In one embodiment, the invention relates to polymers and the process of making said polymers including homopolymers and copolymers that are produced by the transition metal catalyzed olefin addition polymerization of one or more olefins having formula (II)–(IV) described in detail above. In a particularly preferred embodiment the polymer comprises functionalized olefin monomer II, wherein $R^1$ and $R^2$ are independently substituted hydrocarbyl, even more preferably such that II is 3,4-diacetoxy-1-butene; or $R^1$ and $R^2$ collectively form a bridging group Y, such that II is 2,2-dimethyl-4-vinyldioxolane or vinyl ethylene carbonate. In this particularly preferred and even more preferred embodiments, the resultant polymer may be a homopolymer, copolymer comprising at least two monomers selected from 3,4-diacetoxy-1-butene, 2,2-dimethyl-4-vinyldioxolane, and vinyl ethylene carbonate, or a copolymer comprising, in addition to at least one of 3,4-diacetoxy-1-butene, 2,2-dimethyl-4-vinyldioxolane, and vinyl ethylene carbonate, non-polar monomer (I), described previously, and may additionally contain carbon monoxide.

It is desirable that the polymers and copolymers described herein possess an average degree of polymerization of 10 or more, and that the polymer is not a homopolymer of vinyl ethylene carbonate. Homopolymers of 2,2-dimethyl-4-vinyldioxolane, however, are specifically within the scope of the invention.

In another embodiment of the invention, olefin copolymers of the present invention are produced by the transition metal catalyzed olefin addition polymerization of olefins having formula (I), below, with one or more of the olefins having the previously described formulas (II)–(IV).

In a more particular aspect of this embodiment, the copolymer is prepared from functionalized olefin monomers of formulas II, III, or IV, wherein the bridging group Y forms a carbocyclic ring, more particularly from olefin monomers of formulas II, III, or IV, especially wherein Y forms an oxo-substituted carbocyclic ring.

In another more particular aspect of this embodiment, the copolymer is derived from olefin monomer I, and functionalized olefin monomers II and/or III. More particularly, the copolymer is derived from I and II. Desirably, the olefin polymerization reaction product contains at least some of the polar functional groups of the functionalized olefin monomer intact (e.g., $OR^1$ and/or $OR^2$ in II, the epoxide functional group in III, or the ether functional group in IV).

Olefin monomers described by I are non-polar olefins, such as ethylene, propylene, cyclopentene, norbornene, etc. As mentioned, $R^3$ and $R^4$ are independently selected from hydrogen or hydrocarbyl, or $R^3$ and $R^4$ may collectively form a bridging group Z, wherein Z is hydrocarbyl, to provide a carbocyclic ring, in particular a non-aromatic carbocyclic ring, and more particularly, a non-aromatic unsaturated carbocyclic ring. The hydrocarbyl groups may be linear or branched chain saturated or unsaturated hydrocarbon groups, and may be a non-aromatic carbocyclic ring or contain aromatic rings. Examples of suitable hydrocarbyl groups include but are not limited to methyl, ethyl, butyl, propyl, isobutyl, isopropyl, hexyl, phenyl, benzyl, and the like. Examples of suitable carbocylic rings include but are not limited to cyclobutene, cyclopentene, cyclohexene, norbornene, and the like.

As mentioned, $R^1$ and $R^2$ are independently hydrogen, hydrocarbyl, substituted hydrocarbyl, or heteroatom connected hydrocarbyl, or $R^1$ and $R^2$ collectively may form a divalent (bridging) hydrocarbyl or divalent (bridging) substituted hydrocarbyl.

In a particular aspect of this embodiment, in olefin monomer I, $R^3$ and $R^4$ are independently hydrogen or hydrocarbyl, such that monomer I is ethylene, propylene, 1-butene, 1-hexene, or 1-octene; or $R^3$ and $R^4$ collectively from a bridging group Z, such that monomer I is cyclopentene or norbornene. Copolymers of ethylene, norbornene, and at least one functionalized olefin monomer unit, such as those obtained by polymerizing monomers of formulas VI and VII, are particularly within the scope of the invention, as are copolymers of cyclopentene and vinyl ethylene carbonate.

As a further preferred aspect of the invention, there is provided a polymer having monomer units comprising the structure:

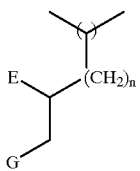

wherein E and G are defined above and n is greater than or equal to 0.

In another particular aspect of this embodiment, in functionalized olefin monomer II, $R^1$ and $R^2$ are independently substituted hydrocarbyl, such that monomer II is 3,4-diacetoxy-1-butene; or $R^1$ and $R^2$ collectively form a bridging group Y, such that monomer II is 2,2-dimethyl-4-vinyldioxolane or vinyl ethylene carbonate, and copolymers of these monomers and ethylene are specifically within the scope of the invention. Functionalized monomers of the type II typically enchain so as to give monomer units of the formula below:

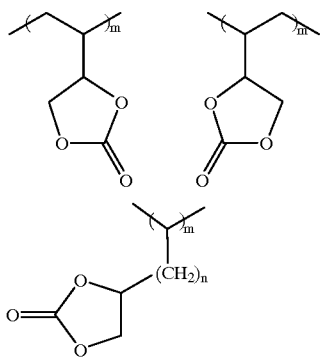

wherein m is greater than 1 and n is greater than or equal to 0, and which typically occur at or near the ends of branches of the polymer chain.

The polymers and copolymers described herein also desirably possess an average degree of polymerization of 10 or more. However, oligomers can also be prepared and in some cases are preferable. In this case the polymers and copolymers will possess an average degree of polymerization of less than 10. It is preferred, however, that the molecular weight of the polymers and copolymers, measured as number average molecular weight by GPC, range from about $10^4$ to about $10^7$. It will be recognized by one of skill in the art in possession of the present disclosure that polymers and copolymers having higher and lower molecular weights can be prepared, and that the preferred molecular weight will depend in large measure on the intended end use of the materials and the specific monomers that comprise the polymer or copolymer.

The olefin monomers and functionalized olefin monomers and monomer units in this embodiment of the invention are as described above with respect to the previous embodiments. Copolymers of carbon monoxide, ethylene, and vinyl ethylene carbonate are specifically within the scope of the invention.

These polymers are readily prepared using bidentate ligands having donating atoms selected from nitrogen, phosphorus, or mixtures of nitrogen and phosphorus, such as bis-nitrogen-ligated, amidate-imidate-ligated, bis-amidate-ligated, bis-imidate-ligated, bis-thioimidate ester-ligated, α-diimine-ligated Group 8–10 transition metal complexes, or the reaction product of Pd(OAc)$_2$, 1,3-bis(diphenylphosphino)propane, Ni(ClO$_4$)$_2$.6H$_2$O, and 1,4-naphthoquinone, as the reaction catalyst. Numerous such bidentate ligands are known, such as those set forth in the references cited in the Background, above. A particularly suitable Pd(II) catalyst is that of formula X below:

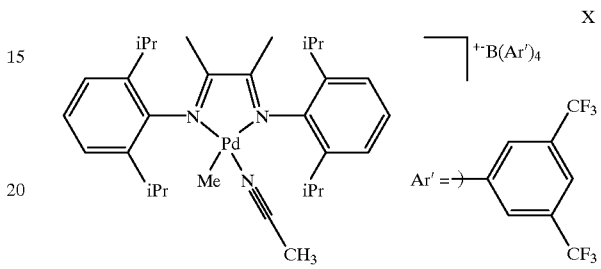

X wherein all structures, symbols, and terms take their conventional meanings, i.e., the terms "iPr", and "Me" are isopropyl, and methyl, respectively.

Another Pd(II) catalyst of formula XI (Brookhart et. al., J. Am. Chem. Soc., 1992, 114, 5894) that is particularly suitable for copolymerizing a non-polar olefin monomer, a functionalized olefin monomer, and carbon monoxide is shown below:

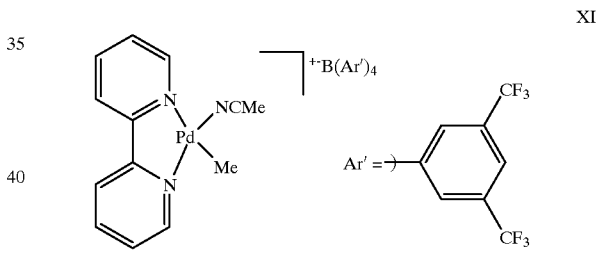

XI wherein, the term "Me" takes on its ordinary meaning as methyl.

Another catalyst system particularly suitable for copolymerizations involving a carbon monoxide monomer is generated in situ by contacting Pd(OAc)$_2$, 1,3-bis(diphenylphosphino)propane, Ni(ClO$_4$)$_2$.6H$_2$O, and 1,4-naphthoquinone in MeOH in the presence of the desired monomers (Drent, E. (Shell), Eur. Pat. Appl. 504,985 (1992)).

Again, the polymerizations may be conducted as solution polymerizations, as non-solvent slurry type polymerizations, as slurry polymerizations using one or more of the olefins or other solvent as the polymerization medium, or in the gas phase. Of course it is to be understood that the catalyst could be supported using a suitable catalyst support and methods known in the art. Inert solvents, such as toluene, methylene chloride, and the like, may be used. Propylene and 1-butene are excellent monomers for use in slurry-type copolymerizations and unused monomer can be flashed off and reused.

Temperature and olefin pressure have significant effects on copolymer structure, composition, and molecular weight. Suitable polymerization temperatures are typically from about −50° C. to about 150° C., and are most preferably in the range of 25° C. to 90° C. Typical polymerization pressures are from about 1 psi to about 100 psi when using volatile monomers such as ethylene, propylene, 1-butene, etc., and about 15 to about 1000 psi when carbon monoxide is used as a monomer.

After the reaction has proceeded for a time sufficient to produce the desired polymer comprising the functionalized olefin monomers, the polymer can be recovered from the reaction mixture by routine methods of isolation and/or purification.

High molecular weight resins are readily processed using conventional extrusion, injection molding, compression molding, and vacuum forming techniques well known in the art. Useful articles made from them include films, fibers, bottles and other containers, sheeting, molded objects and the like. The homopolymers and copolymers described herein, in particular those derived from (i) epoxybutene or derivatives thereof, (ii), ethylene, propylene, and mixtures thereof, and (iii) carbon monoxide, have excellent barrier properties—e.g., with regard to volatile gases such as oxygen, carbon dioxide and water vapor—when the polymer is post-polymerization modified to provide an appreciable concentration of hydroxyl groups.

Post-polymerization modifications, including but not limited to hydrolysis, crosslinking, blending with other polymers, reactive blending, and combinations thereof, are specifically within the scope of the present invention. For instance, hydroxy functionality can be introduced to a copolymer comprising cyclopentene and vinyl ethylene carbonate by reacting the copolymer with water under appropriate conditions to produce a copolymer having the following structure:

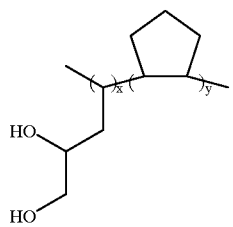

LIIA wherein x and y vary from greater than zero to less than 1, x+y=1, and x and y represent the mole fractions of the respective monomer units.

As yet another example, the polymers produced of the present invention can themselves be further polymerized. Structure (LIIA) above may be viewed as a diol of the following formula (LIIB):

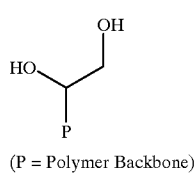

LIIB (P = Polymer Backbone)

which can be used, for instance, for polyester or polycarbonate synthesis as shown below:

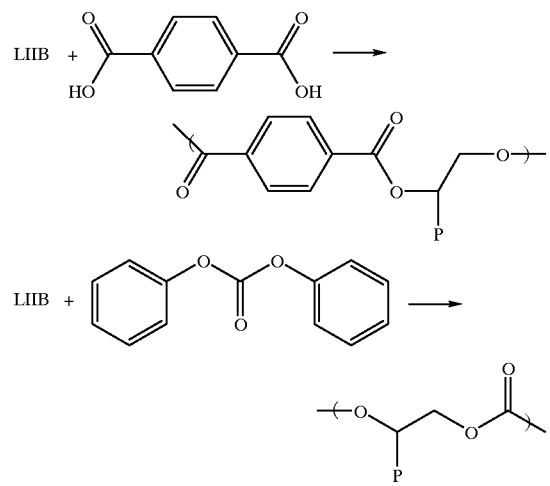

Low molecular weight resins are useful, for example, as synthetic waxes and they may be used in various wax coatings or in emulsion form. They are also particularly useful in blends with ethylene/vinyl acetate or ethylene/methyl acrylate-type copolymers in paper coating or in adhesive applications.

Although not required, typical additives used in olefin or vinyl polymers may be used in the new homopolymers and copolymers of this invention. Typical additives include pigments, colorants, titanium dioxide, carbon black, antioxidants, stabilizers, slip agents, flame retarding agents, and the like. These additives and their use in polymer systems are per se well-known in the art.

EXAMPLES

The following examples are meant to illustrate the present invention. Numerous modifications and variations are possible, and it is to be understood that within the scope of the appended claims, the invention may be practiced otherwise than as specifically described herein.

Example 1

2,2-Dimethyl-4-Vinyldioxolane Homopolymer

A 300 mL flame dried round bottom Schlenk flask is charged with α-diimine Pd(II) catalyst X in an argon filled glove box. Upon removal from the glove box, the flask is evacuated and backfilled with argon. The catalyst is dissolved in $CH_2Cl_2$ and immediately treated with 2,2-dimethyl-4-vinyldioxolane. The resulting solution is stirred at 23° C. under an argon atmosphere overnight. A homopolymer of 2,2-dimethyl-4-vinyldioxolane results. The polymer is collected and dried in vacuo.

Example 2

Ethylene/2,2-Dimethyl-4-Vinyldioxolane Copolymer

A flame dried 300 mL Schlenk polymerization flask was charged with dry $CH_2Cl_2$ (40 mL) and 2,2-dimethyl-4-vinyldioxolane (12 mL) under an ethylene atmosphere (1 atm). A separate flask was charged with α-diimine Pd(II) catalyst X (100 mg) in an argon filled glove box. The catalyst was dissolved in dry $CH_2Cl_2$ (10 mL) to afford an orange solution. This catalyst solution was transferred via stainless steel cannula to the polymerization flask. The resulting orange solution was stirred for 65 h at 25° C. under an ethylene atmosphere (1 atm). The polymerization was quenched with acetone, and the solvent and residual monomer removed in vacuo. The oily monomer unit was washed with methanol (MeOH) (5×10 mL) to afford a gray solid, which was dried in vacuo at 100° C. for 6 h, then at 25° C. for three days. $^1$H and $^{13}$C NMR analysis was consistent with a copolymer containing both ethylene and 2,2-dimethyl-4-vinyldioxolane monomer units.

Example 3

Ethylene/Vinylethylene Carbonate Copolymer

A 300 mL flame dried round bottom Schlenk flask was charged with α-diimine Pd(II) catalyst X (100 mg) in an argon filled glove box. Upon removal from the glove box, the flask was evacuated and backfilled with ethylene. The catalyst was dissolved in $CH_2Cl_2$ (50 mL) and immediately treated with vinylethylene carbonate (12 mL). The resulting orange solution was stirred at 23° C. under an ethylene atmosphere (1 atm) overnight. A small amount of polymer had precipitated out of solution. The polymerization was quenched with MeOH and filtered on a glass frit. The polymer was collected and dried in vacuo at 60° C. for 3 days to afford a tacky solid (800 mg). $^1$H NMR was consistent with a copolymer containing approximately 99.5 mole % ethylene and 0.5 mole % vinylethylene carbonate monomer units. IR ($CH_2Cl_2$ film) 1818 cm$^{-1}$; $M_n$ 40,000 $^g/_{mol}$; $M_w$ 81,000 $^g/_{mol}$; DSC $T_g$–62° C., $T_m$–30° C.

Example 4

Cyclopentene/VEC Copolymer

A flame dried Schlenk flask was charged with α-diimine Pd(II) catalyst X (75 mg) in an argon filled glove box. The flask was removed from the glove box and charged with vinylethylene carbonate (10 mL), $CH_2Cl_2$ (50 ml) and cyclopentene (10 ml) resulting in a yellow orange solution. The flask was backfilled with argon and stirred for 48 hours at 23° C. Copolymer began to precipitate within 2 hours of reaction initiation. The polymerization was quenched with methanol and the powdery copolymer was isolated by filtration on a fritted glass filter and dried in vacuo at 60° C. $^1$H NMR was consistent with a copolymer containing approximately 90 mole % cyclopentene and 10 mole % vinylethylene carbonate monomer units.

Example 5

Ethylene/2,3-Dihydrofuran (2,3-DHF) Copolymer

A flame dried Schlenk flask was charged with α-diimine Pd(II) catalyst X (200 mg) in an argon filled glove box. The flask was removed from the glove box, placed under an ethylene atmosphere and charged with 15 ml 2,3-Dihydrofuran (2,3-DHF) and 15 ml $CH_2Cl_2$. The 2,3-DHF reacted violently with the Pd(II) cation resulting in the rapid cationic polymerization of 2,3-DHF.

Example 6

Ethylene/CO/VEC Copolymer $Pd(OAc)_2$, 1,3-bis(diphenylphosphino)propane, $Ni(ClO_4)_2 \cdot 6H_2O$, and 1,4-naphthoquinone are combined in a polymerization flask. The flask is evacuated and charged with an atmosphere of ethylene/CO (1:1 mole ratio). Then, MeOH (20 mL) and vinylethylene carbonate (20 mL) are added. The reaction mixture is stirred under an atmosphere of a 1:1 ethylene/CO gas mixture for one hour. A terpolymer of ethylene/CO/VEC results. The polymer is collected by filtration and dried under high vacuum.

Example 7

Cp/VEC hydrolysis

The polymer of Example 4 is hydrolyzed with mild base to produce a copolymer of cyclopentene/3-butene-1,2-diol.

Example 8

Ethylene/Vinylethylene Carbonate Copolymer

A 200 mL flame dried pear-shaped Schlenk flask equipped with a magnetic stir bar and capped with a septum was charged with (2,6-di-isopropylphenylimino)-1,4-dithiane Pd(II) catalyst XII (100 mg) in an argon filled glove box.

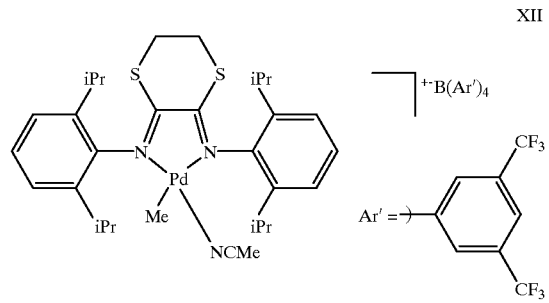

XII

Upon removal from the glove box, the flask was evacuated and backfilled with ethylene. The catalyst was dissolved in $CH_2Cl_2$ (25 mL) and immediately treated with vinyl ethylene carbonate (5 mL). The resulting orange solution was stirred at 23° C. under an ethylene atmosphere (1 atm) for 20 hours. A small amount of polymer had precipitated out of solution. The polymerization was quenched with MeOH and acetone leaving gray oil adhering to the walls of the flask. The polymer was washed several times with acetone and MeOH to remove any remaining monomer. The polymer was dissolved in $CH_2Cl_2$ and transferred to a storage jar. The solvent was left to evaporate and the resulting oily polymer was dried in vacuo at ~80° C. for 3 days to afford a tacky solid (2.15 g, 1100 TO). $^1$H NMR was consistent with a copolymer containing approximately 96.5 weight % ethylene and 3.5 weight % vinyl ethylene carbonate monomer units.; $M_n$ 40,000 $^g/_{mol}$; $M_w$ 92,000 $^g/_{mol}$; DSC $T_g$–68° C., $T_m$–38° C.

Example 9

Ethylene/Vinylethylene Carbonate Copolymer

A 200 mL flame dried pear-shaped Schlenk flask equipped with a magnetic stir bar and capped with a septum was charged with (2,6-di-isopropylphenylimino)-1,4-dithiane Pd(II) catalyst XII (100 mg) in an argon filled glove box. Upon removal from the glove box, the flask was evacuated and backfilled with ethylene. The catalyst was dissolved in $CH_2Cl_2$ (20 mL) and immediately treated with vinyl ethylene carbonate (10 mL). The resulting orange solution was stirred at 23° C. under an ethylene atmosphere (1 atm) for 28 hours. A small amount of polymer had precipitated out of solution. The polymerization was quenched with MeOH and acetone leaving gray oil adhering to the walls of the flask. The polymer was dissolved in $CH_2Cl_2$ and transferred to a storage jar. The solvent was left to evaporate and the resulting oily polymer. The polymer was washed several times with acetone and MeOH to remove any remaining monomer and was dried in vacuo at ~80° C. for 1 day to afford a tacky solid (1.15 g, 613 TO). $^1$H NMR was consistent with a copolymer containing approximately 95.5 weight % ethylene and 4.5 weight % vinyl ethylene carbonate monomer units.; $M_n$ 15,400 $^g/_{mol}$; $M_w$ 96,000 $^g/_{mol}$; DSC $T_g$–64° C., $T_m$–31° C.

Example 10

Propylene/Vinylethylene Carbonate Copolymer

A 200 mL flame dried pear-shaped Schlenk flask equipped with a magnetic stir bar and capped with a septum was charged with (2,6-di-isopropylphenylimino)-1,4-dithiane Pd(II) catalyst XII (100 mg) in an argon filled glove box. Upon removal from the glove box, the flask was evacuated and backfilled with propylene. The catalyst was dissolved in $CH_2Cl_2$ (20 mL) and immediately treated with vinyl ethylene carbonate (5 mL). The resulting orange solution was stirred at 23° C. under a propylene atmosphere (1 atm) for 20 hours. A small amount of polymer had precipitated out of solution. The polymerization was quenched with MeOH and acetone leaving oil adhering to the walls of the flask. The polymer was washed several times with acetone and MeOH to remove any remaining monomer. The polymer was dissolved in $CH_2Cl_2$ and transferred to a storage jar. The solvent was left to evaporate and the resulting oily polymer was dried in vacuo at ~80° C. for 2 days to afford a tacky solid (0.8 g, 284 TO). $^1$H NMR was consistent with a copolymer containing approximately 91.9 weight % propylene and 8.1 weight % vinyl ethylene carbonate monomer units.; $M_n$ 4000 $^g/_{mol}$; $M_w$ 8110 $^g/_{mol}$.

The examples show that certain polar monomers, including epoxybutene and derivatives thereof, can be polymerized using transition metal catalyzed olefin addition polymerization reactions with each other, with other olefins, and with other monomers such as carbon monoxide, using catalysts of the present invention.

While not wishing to be bound by theory, it is believed that the use of these ligated transition metal catalysts makes the system tolerant of functional groups that contain oxygen and other heteroatoms, allowing for the olefin addition polymerization of functionalized olefin monomers, such as epoxybutene and derivatives thereof, without deactivation of the catalyst. The described reactions proceed under mild conditions (e.g. 23° C., inert solvent, 15–100 psi), and do not require the use of a reactive initiator (e.g. a peroxide). As a result, functionalized olefin monomers, such as epoxybutene and derivatives of epoxybutene, can be enchained via the olefinic carbons, leaving the pendant functionality intact.

The examples also show that these functionalized olefin monomers can be incorporated into copolymers based on non-polar olefins such as ethylene, propylene, cyclobutene, norbornene, etc., or on non-polar olefins and carbon monoxide, using transition metal catalyzed olefin addition polymerization reactions, wherein the catalysts are Group 8–10 transition metal-based catalysts having bidentate ligands with N- and/or P-donor atoms as discussed herein. Again, not wishing to be bound by theory, it is believed that the use of such ligated transition metal catalyst makes the system less sensitive (relative to a Ti or Zr catalyst) to functional groups which contain oxygen and other heteroatoms.

The polymers of the present invention can be used in diverse applications, such as for injection or compression molding, extruded films or sheeting, extrusion coatings onto photographic paper and thermal and digital imaging paper, and as a replacement for poly(ethylene-vinyl alchol) (EVOH) and poly(vinyl alcohol) (PVOH) in many of their current applications, but it is not limited thereto.

The invention has been described above in detail with particular reference to preferred embodiments thereof, but it will be understood that variations and modifications other than as specifically described herein can be effected within the spirit and scope of the invention. Moreover, all patents and literature references or other references cited herein are hereby incorporated by reference.

We claim:

1. A polymer prepared by olefin addition polymerization, wherein said olefin addition polymerization is other than a free radical polymerization, comprising groups of the formula (L):

$$-[F]_S-[N]_T-[CO]_V- \quad (L)$$

wherein F is a monomer unit prepared directly in said polymerization from at least one compound of the formula XV;

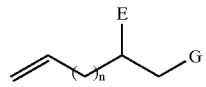

XV wherein E and G represent the same or different divalent heteroatoms selected from oxygen, nitrogen, and sulfur, which are in turn bound to a hydrocarbyl or substituted hydrocarbyl radical, or are linked via a divalent organic linking group;

n is 0 or an integer from 1–20;

or F is a monomer unit derived from 2,5-dihydrofuran; and wherein N is selected from
(i) a monomer unit derived from at least one olefin monomer of the formula (I) wherein the compound of formula I is selected from the group consisting of ethylene, propylene cyclopentene, norbornene, butene, pentene, hexene, and octene; or
(ii) a monomer unit derived from a monomer selected from methacrylic acid, methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, glycidyl methacrylate, carbodiimide methacrylate, alkyl crotonates, and vinyl acetate; or
(iii) a monomer unit derived from a $C_2$–$C_{20}$ alkene substituted one or two times with a group selected from $C_1$–$C_{10}$ alkoxy, hydroxy, phenoxy, or acetate; and CO is a carbon monoxide monomer unit, S, T, and V represent the mole fraction of the respective monomer units and sum to one, with the proviso that S>0, and V≦0.5.

2. The polymer of claim 1, wherein T=0.
3. The polymer of claim 1, wherein T>0.
4. The polymer of claim 3, wherein V=0.
5. The polymer of claim 3, wherein 0<V≦0.5.
6. The polymer of claim 1, wherein more than one type of monomer unit of formula F is present.

7. The polymer of claim 1, wherein T=0 and V=0.
8. The polymer of claim 1, wherein F is a monomer unit of a monomer selected from
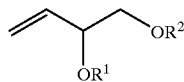 II
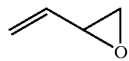 III
 IV
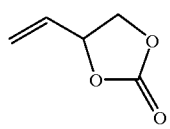 V
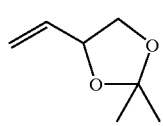 VI
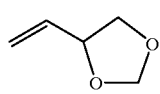 VII
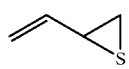 VIII
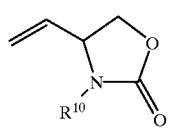 IX
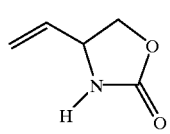 X
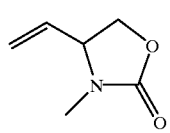 XI
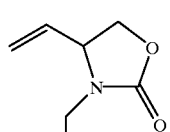 XII
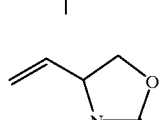 XIII
-continued
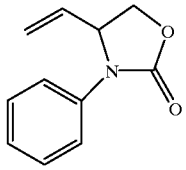 XIV
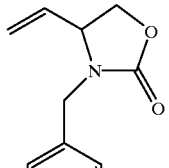 XVI
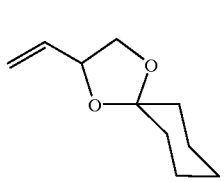 XVII
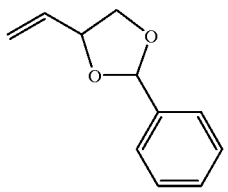 XVIII
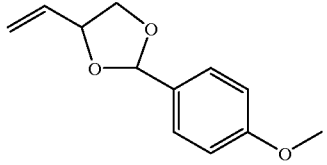 XIX
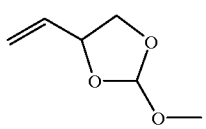 XX
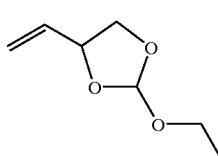 XXI
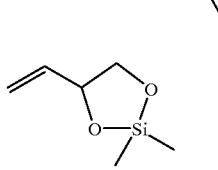 XXII
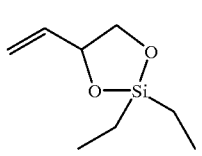 XXIII

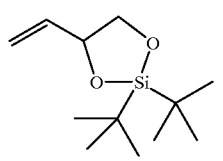
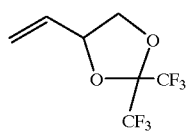
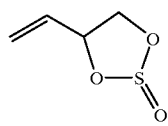
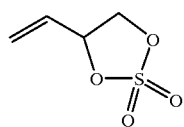
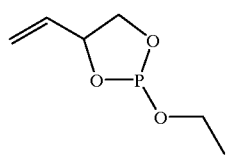
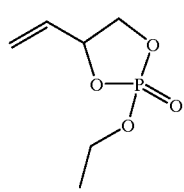
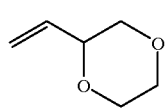
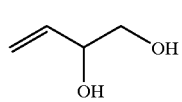
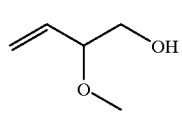
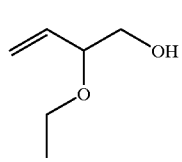
XXIV
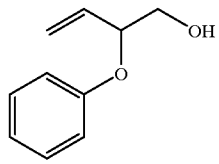
XXXIV
XXV
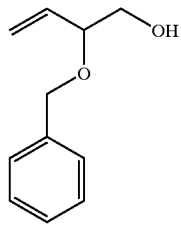
XXXV
XXVI
XXVII
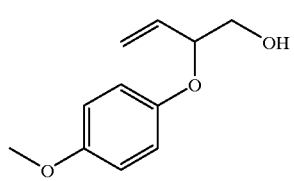
XXXVI
XXVIII
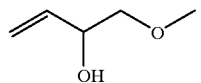
XXXVII
XXXVIII
XXIX
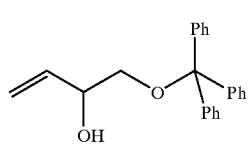
XXXIX
XL
XXX
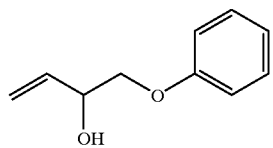
XXXI
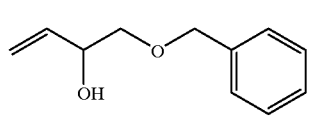
XLI
XXXII
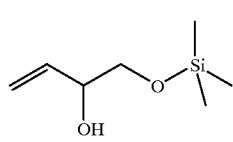
XLII
XXXIII
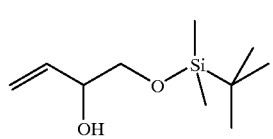
XLIII XLIV
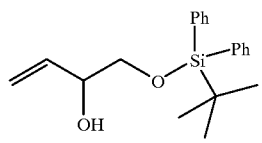
XLV
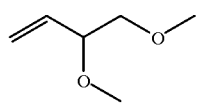
XLVI
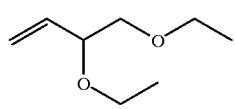
XLVII
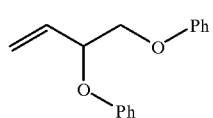
XLVIII
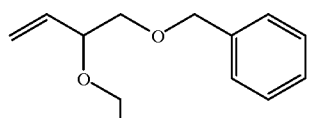
XLIX
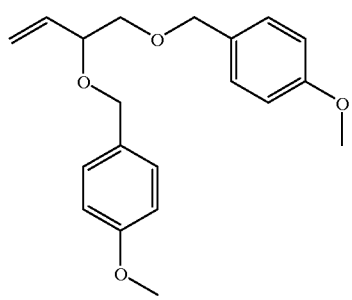
LXVIII
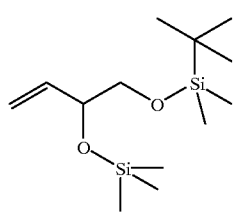
LXIX
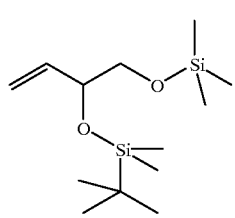
LXX
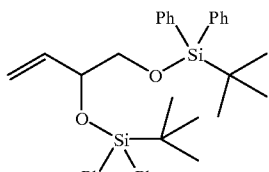
LIII
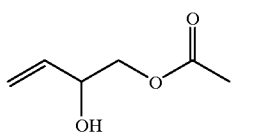
LIV
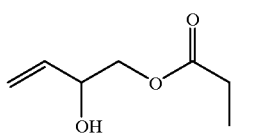
LV
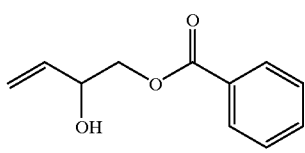
LVI
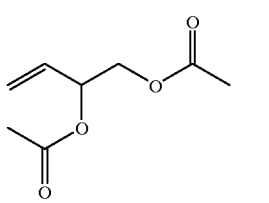
LVII
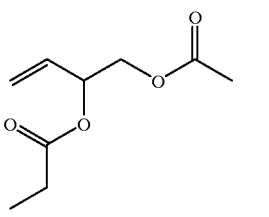
LVIII
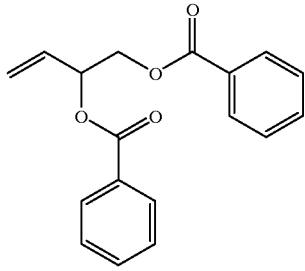
LIX
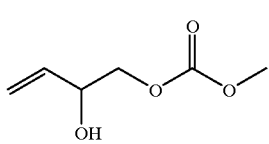

-continued

LX
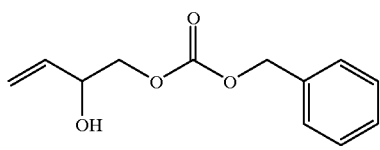

LXI
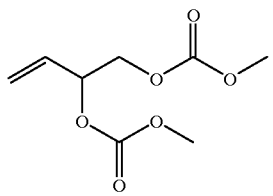

LXII
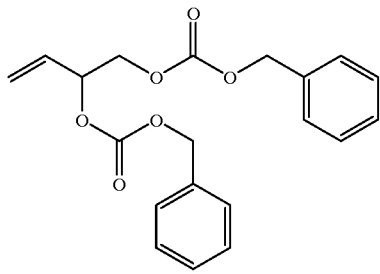

LXIII
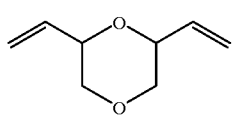

LXIV
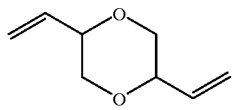

LXV
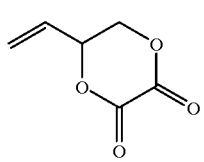

LXVI
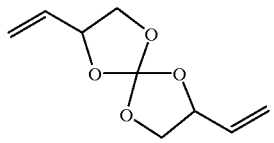

LXVII
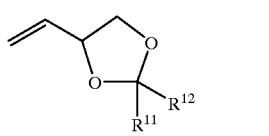

wherein $R^1$ and $R^2$ are independently hydrogen, hydrocarbyl, substituted hydrocarbyl, heteroatom connected hydrocarbyl, or $R^1$ and $R^2$ collectively form a bridging group Y, wherein Y is hydrocarbyl, substituted hydrocarbyl, heteroatom connected hydrocarbyl, or heteroatom connected substituted hydrocarbyl; and $R^{10}$, $R^{11}$, and $R^{12}$ are independently hydrogen, hydrocarbyl, or substituted hydrocarbyl; and Ph is phenyl.

9. The polymer of claim 1, wherein F is a monomer unit prepared directly in said polymerization from a monomer selected from:

II
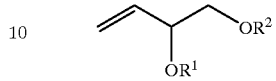

III
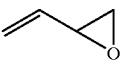

IV

VIII

IX
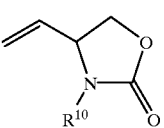

wherein $R^1$ and $R^2$ are independently hydrogen, hydrocarbyl, substituted hydrocarbyl, heteroatom connected hydrocarbyl, or $R^1$ and $R^2$ collectively form a bridging group Y, wherein Y is hydrocarbyl, substituted hydrocarbyl, heteroatom connected hydrocarbyl, or heteroatom connected substituted hydrocarbyl and $R^{10}$ is independently hydrogen, hydrocarbyl, or substituted hydrocarbyl.

10. The polymer of claim 9, wherein F is a monomer unit prepared directly in said polymerization from a monomer selected from the group consisting of II, III, and IV.

11. The polymer of claim 10, wherein F is a monomer unit prepared directly in said polymerization from a compound of formula II.

12. The polymer of claim 10, wherein F is a monomer unit prepared directly in said polymerization from a compound of formula III.

13. The polymer of claim 10, wherein F is a monomer unit prepared directly in said polymerization from a compound of formula IV.

14. The polymer of claim 11, wherein F is a monomer unit prepared directly in said polymerization from vinyl ethylene carbonate and/or 2,2-dimethyl vinyl dioxolane.

15. The polymer of claim 3, wherein N is a monomer (I):

I
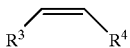

wherein $R^3$ and $R^4$ are independently hydrogen or hydrocarbyl, or $R^3$ and $R^4$ collectively form a bridging group K, wherein K is hydrocarbyl, to provide one or more non-aromatic unsaturated carbocyclic rings.

16. The polymer of claim 1 comprised of monomer units of the formula (B):

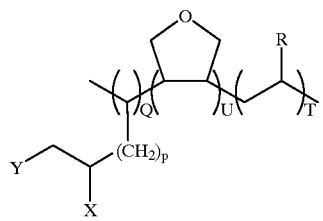

wherein Q, U, and T, representing the mole fraction of the corresponding monomer unit, range from 0 to 1 and sum to 1, Q+U>0, p ranges from 0 to 10;

R is hydrogen or hydrocarbyl;

X and Y are independently OAc, OPh, O-alkyl, OH, SH, S-alkyl, CN, or $OR_f$, wherein $R_f$ is fluorinated hydrocarbyl and Ac is acyl; or X and Y together can form bridging group J, wherein J is —O—, —S—, —N($R^{10}$) CO—O—,

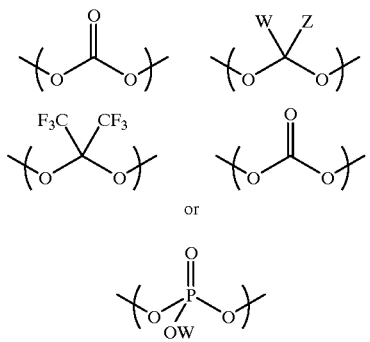

wherein $R^{10}$ is hydrogen, hydrocarbyl, or substituted hydrocarbyl, and W and Z are independently H, hydrocarbyl, or substituted hydrocarbyl.

17. The polymer of claim 16, wherein p=1.

18. The polymer of claim 16, wherein Q>0 and U=0.

19. The polymer of claim 1 wherein said polymer is comprised of monomer units of the formula:

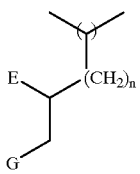

wherein E and G represent the same or different divalent heteroatoms selected from oxygen, nitrogen, and sulfur, which are in turn bound to a hydrocarbyl or substituted hydrocarbyl radical, or are linked via a divalent organic linking group; and n is 0 or an integer from 1–20.

20. The polymer of claim 15, wherein said polymer is comprised of monomer units of the formula:

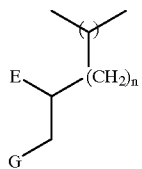

wherein E and G represent the same or different divalent heteroatoms selected from oxygen, nitrogen, and sulfur, which are in turn bound to a hydrocarbyl or substituted hydrocarbyl radical, or are linked via a divalent organic linking group; and n is 0 or an integer from 1–20.

21. The polymer of claim 4, wherein said polymer is comprised of monomer units of the formula:

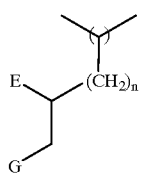

wherein E and G represent the same or different divalent heteroatoms selected from oxygen, nitrogen, and sulfur, which are in turn bound to a hydrocarbyl or substituted hydrocarbyl radical, or are linked via a divalent organic linking group; and n is 0 or an integer from 1–20.

22. The polymer of claim 11, wherein said polymer is comprised of monomer units of the formula:

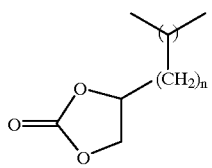

wherein n is greater than or equal to 0.

23. The polymer of claim 8, wherein V=0.

24. The polymer of claim 22, wherein V>0.

25. The polymer of claim 1 comprised of monomer units of the formula (C):

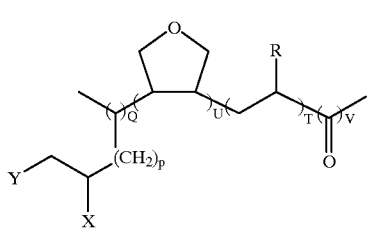

wherein Q, U, T, and V, represent the mole fraction of the corresponding monomer units and Q≦1, U≦1, Q+U>0, T<1, V≦0.5, Q,U,T and V sum to 1, and p ranges from 0 to 10;

X and Y are independently OAc, OPh, O-alkyl, OH, SH, S-alkyl, CN, or $OR_f$, wherein $R_f$ is fluorinated hydrocarbyl and Ac is acyl; or X and Y together can form bridging group J, wherein J is —O—, —S—, —Se—, —N(R$^{10}$)CO—O—,

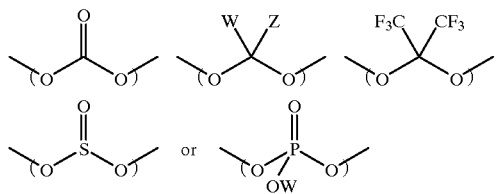

wherein R$^{10}$ is hydrogen, hydrocarbyl, or substituted hydrocarbyl; Ph is phenyl; W and Z are independently H, hydrocarbyl, or substituted hydrocarbyl; R is hydrogen or hydrocarbyl; and both T and V are greater than zero.

26. The polymer of claim 1, wherein F is a monomer unit prepared directly in said polymerization from vinyl ethylene carbonate, N is a monomer unit derived from ethylene, and V=0.

27. The polymer of claim 1, wherein F is a monomer unit prepared directly in said polymerization from 2,2-dimethylvinyl dioxolane, N is a monomer unit derived from ethylene, and V=0.

28. The polymer of claim 1, wherein F is a monomer unit prepared directly in said polymerization from vinyl ethylene carbonate, N is a monomer unit derived from cyclopentene, and V=0.

29. The polymer of claim 1, wherein F is a monomer unit prepared directly in said polymerization from 3,4-diacetoxy-1-butene, N is a monomer unit derived from ethylene, and V=0.

* * * * *

UNITED STATES PATENT AND TRADEMARK OFFICE
CERTIFICATE OF CORRECTION

PATENT NO. : 6,090,900
DATED : July 18, 2000
INVENTOR(S) : Turner et al.

Page 1 of 1

It is certified that error appears in the above-identified patent and that said Letters Patent is hereby corrected as shown below:

<u>Column 35, claim 8,</u>
Formula LXVIII, that portion of the formula reading:

Formula LXIX, that portion of the formula reading:

<u>Column 39, claim 16,</u>
Line 35, the formula reading:

Signed and Sealed this

Twenty-ninth Day of January, 2002

Attest:

JAMES E. ROGAN
Attesting Officer   Director of the United States Patent and Trademark Office